United States Patent [19]

Ueda et al.

[11] Patent Number: 5,300,276
[45] Date of Patent: Apr. 5, 1994

[54] PROCESSES FOR PREPARING HYDROGEN GAS AND DETERMINING RATIO OF MASSES BETWEEN HYDROGEN ISOTOPES THEREIN

[75] Inventors: Akira Ueda; Yasuhiro Kubota, both of Omiya; Tsutomu Araki, Kagawa, all of Japan

[73] Assignee: Mitsubishi Materials Corporation, Tokyo, Japan

[21] Appl. No.: 863,717

[22] Filed: Apr. 3, 1992

[30] Foreign Application Priority Data

Apr. 4, 1991 [JP] Japan .................. 3-71918
Apr. 12, 1991 [JP] Japan .................. 3-80206

[51] Int. Cl.$^5$ ............................ C01B 3/08
[52] U.S. Cl. .............................. 423/657
[58] Field of Search ........................ 423/657

[56] References Cited

U.S. PATENT DOCUMENTS

| | | | |
|---|---|---|---|
| 3,348,919 | 10/1967 | Shumway | 423/657 |
| 3,928,550 | 12/1975 | Seitzer | 423/657 |
| 4,005,185 | 1/1977 | Ishizaka | 423/657 |
| 4,371,500 | 2/1983 | Papinaeau | 423/657 |
| 4,588,577 | 5/1986 | Cardinal | 423/657 |

FOREIGN PATENT DOCUMENTS 2102662 8/1971 Fed. Rep. of Germany ...... 423/657

OTHER PUBLICATIONS

Anal. Chem., vol. 54, 1982, pp. 993–995, M. L. Coleman, et al., "Reduction of Water With Zinc For Hydrogen Isotope Analysis".

Anal. Chem., vol. 57, 1985, pp. 1437–1440, C. Kendall, et al., "Multisample Conversion of Water to Hydrogen by Zinc for Stable Isotope Determination".

Anal. Chem., vol. 24, No. 8, Aug. 1952, 3 pages, J. Bigeleisen, et al., "Conversion of Hydrogenic Materials to Hydrogen for Isotopic Analysis".

*Primary Examiner*—Wayne Langel
*Attorney, Agent, or Firm*—Oblon, Spivak, McClelland, Maier & Neustadt

[57] ABSTRACT

The present invention relates to a process for preparing hydrogen gas from the reduction of water, and also relates to a process for determining the ratio of the masses between hydrogen isotopes in the obtained hydrogen gas. The invention provides a process of preparing hydrogen gas comprising steps of: (i) preparing zinc metal particles having a size approximately in the range of 1 mm–2 mm by dropping a mixture of a selected amount of liquified zinc metal and 10 to 10000 ppm of nickel elements into a water bath; and (ii) reacting a sample of water with zinc metal particles at a selected reaction temperature to perform the reduction reaction of the water. The invention also provides a process of determining the ratio of the masses between hydrogen isotopes, $^1H$ and $^2H$, in a sample of water. This process comprises a step of preparing hydrogen gas from the sample by the novel method described above.

7 Claims, 1 Drawing Sheet

PROCESSES FOR PREPARING HYDROGEN GAS AND DETERMINING RATIO OF MASSES BETWEEN HYDROGEN ISOTOPES THEREIN

BACKGROUND OF THE INVENTION

1. Field of the Invention

The present invention relates to a process for preparing hydrogen gas from the reduction of water, and also relates to a process for determining the ratio of the masses between hydrogen isotopes in the obtained hydrogen gas.

2. Prior Art

Many elements occur in nature as mixtures of isotopes having the same atomic numbers but different mass numbers. One type of such isotopes is a radioactive isotope which is characterized by spontaneous transformation of nucleide into one or more different nucleides. The radioactive isotope of the element, such as $^{14}C$, $^{126}I$, or $^{3}H$ has been used as an isotopic tracer or an isotopic indicator of chemical, biological, and physical processes, and also used in a method of determining the age of geological, archeological objects, or the like. The other type of isotopes is a stable isotope which is characterized by its stable physical properties. The stable isotope of the element has been used as a tracer especially in the field of medical chemistry, environmental monitoring or the like methods so as to avoid side effects of the radiation.

In the case of hydrogen, for example, there are three isotopes existing in nature. First type is an ordinary hydrogen, $^{1}H$, nucleus thereof consists of a single proton and is the most abundant of the three isotopes of hydrogen. Second type is deuterium, $^{2}H$, which is called heavy hydrogen, consisting of one proton and one neutron, and also deuterium is often denoted by a symbol D. It is noted that deuterium naturally occurs only in about 1 of every 5000 atoms of naturally occurring hydrogen. Another isotope of hydrogen, $^{3}H$, is called tritium (symbol T). It is radioactive, and because of its relatively short half-life of 12.3 years, only 1-10 of every $10^{18}$ atoms of naturally occurring hydrogen is tritium.

In general, the mass ratio of stable isotopes of hydrogen, i.e., the ratio of the masses between ordinary hydrogen elements and deuterium elements in a sample of water can be estimated by the method comprising the steps of reduction of water molecules to gasify the whole mass of hydrogen in the sample, and supplying the obtained hydrogen gas into a stable-isotope mass spectrometer for determining the masses of isotopes of the hydrogen gas. The mass spectrometer is a well-known instrument that is able to determine very precisely the masses of ions formed from molecules when they are bombarded by electrons. It is a valuable analytic tool in chemistry and biochemistry.

Conventionally, there are two methods for preparing hydrogen gas from water i.e., a depleted uranium method (uranium reduction method, see Bigeleisen et al., Anal. Chem. 24, 1356–1357, 1952) and a zinc reduction method (see Colemch et al, Anal. Chem. 54, 993–995. The depleted uranium method comprises the steps of: passing water through a unit having depleted uranium at a preferable temperature (700° C.) to generate hydrogen gas by the reduction of water; and recovering the hydrogen gas by means of the tabular pump. On the other hand, the zinc reduction method comprises the steps of: reacting water with zinc at the high temperatures (400°–450° C.) so as to generate hydrogen gas. In this method, the reduction of water proceeds by the following reaction:

$$H_2O + Zn \rightarrow H_2 + ZnO$$

According to the conventional methods described above, hydrogen elements in the sample can be gasified. Consequently, the masses of hydrogen isotopes can be determined by supplying the obtained gas into the mass spectrometer.

However, the conventional methods described above have some problems. In the case of the uranium reduction method, for example, (i) depleted uranium is hard to obtain; (ii) a step of recovering the generated gas is time consuming; (iii) it is difficult to determine the masses of hydrogen isotopes when several different water samples are serially passed through one unit of depleted uranium. In the case of the zinc reduction method, on the other had, it is difficult to perform the reduction of water molecules in the sample perfectly.

Therefore, there has long been felt a need for a simple process of preparing hydrogen gas which may be performed quickly to determine the masses of hydrogen isotopes in the hydrogen gas with a high accuracy of measurement.

SUMMARY OF THE INVENTION

It has now been found that 1-2 mm sized particles comprising zinc pellets, i.e. crystals approximately less than 5 um size and a small amount of nickel elements can be used effectively and advantageously to reduce water chemically into hydrogen gas.

A first aspect of the invention therefore provides a process of preparing hydrogen gas comprising steps of: (i) preparing zinc metal particles having a size approximately in the range of 1 mm–2 mm by dropping a mixture of a selected amount of liquified zinc metal and 10 to 10000 ppm of nickel elements into a water bath; and (ii) reacting a sample of water with zinc metal particles at a selected reaction temperature to perform the reduction reaction of the water. It is important that the zinc metal particles described above comprise zinc crystals having size of 5 $\mu$m or less to perform the reduction of water. In addition, it is preferable that the reaction temperature is lower than that of the melting point of zinc metal, preferably between 400° to 420° C. The duration of the reaction is for 2–4 hours depended on the reaction temperature.

Another aspect of the invention is to provide a process of determining the ratio of the masses between hydrogen isotopes, $^{1}H$ and $^{2}H$, in a sample of water. This process comprises a step of preparing hydrogen gas from the sample by the novel method described above.

Other and further objects, features and advantages of the invention will be presented more fully in the following description.

DETAILED DESCRIPTION OF THE INVENTION

Figure 1:
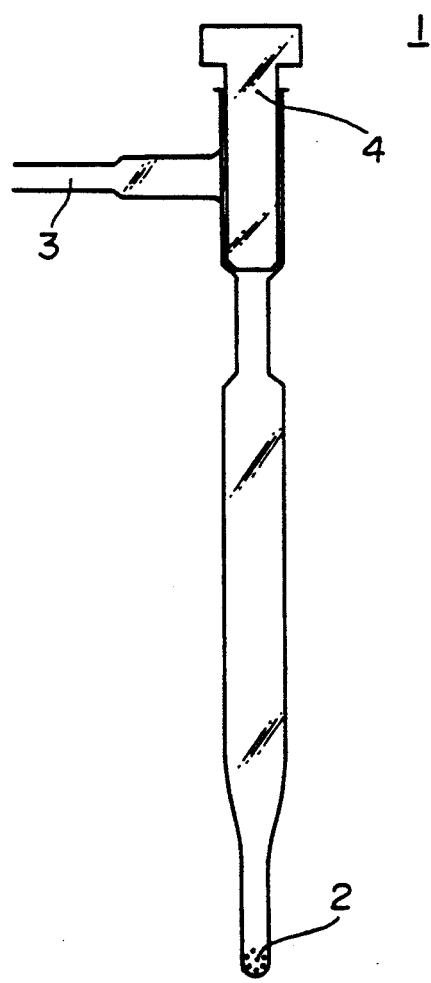
FIG. 1 shows a front view of an apparatus (A 7 mm Pyrex ® reaction vessel with a 10 mm base Yeunge ® greaseless stop cock) used in the process of preparing hydrogen gas by reacting water with the zinc metal particles.

In accordance with the present invention, a process of preparing hydrogen gas from a water sample comprises a step of reacting water with zinc metal particles containing over 10 ppm of nickel.

Before the process, zinc metal particles are prepared. Zinc metal is liquified and mixed with a selected amount of nickel elements. The mixture is granulated by the conventional methods, for example dropping the mixture into water, to obtain particles of diameter 1-2 mm. In general, the zinc crystals in the granulated particles is in the range of 20 $\mu$m to 50 $\mu$m. This size range is not appropriate one for performing the reduction of water and the oxidation of zinc metal to obtain hydrogen gas. According to the present invention, 10-10000 ppm of nickel is added into the liquified zinc metal before the granulation for making small sized zinc crystals i.e., the size thereof is 5 $\mu$m or less. Thus the reduction and the oxidation reactions between water and zinc metal can be effectively performed.

Furthermore, at least one accelerating agent, which is selected from iron, chromium, tin, antimony or other heavy metal group elements but not limited to, can be further comprised in the zinc metal particles for accelerating the reaction between water molecules and zinc metal elements. It is noted that the accelerating agent should be selected from the chemical elements which do not interrupt the granulation of zinc metal in the granulation process described above.

Reduction of water can be accelerated by using another type of zinc metal particles having thin layered structures or porous fine structures with fine zinc crystals having diameter of 5 $\mu$m or less. This type of zinc metal particles can be prepared by quenching the liquified zinc metal with a very low temperature liquid such as liquid nitrogen instead of water, or other methods such as a spray granulation method, a pressed powder molding method or the like.

EXAMPLE 1

An effect of adding nickel elements in zinc metal particles on hydro-gasification rate in the reduction of water was investigated as follows.

(1) Process for Preparing a Reducing Agent

Pure zinc metal was heated at a temperature of at least over its melting point (419° C.) to obtain liquified zinc. After that a selected amount of nickel (Ni) was added to a base amount of liquified zinc, and then granulation of the mixture was performed by dropping it into water so as to make zinc metal particles. In this example, six different types of zinc metal particles, which were used as reducing agents, were prepared so as to contain 0 ppm, 6 ppm, 15 ppm, 40 ppm, 300 ppm, and 500 ppm of Ni, respectively. A diameter of each zinc metal particles was about 2 mm.

(2) Process for Preparing Hydrogen Gas

Referring to FIG. 1, about 1 g of the reducing agent 2 prepared by the above described process (1) were placed in a bottom of a reaction glass tube 1 having a greaseless stop cock 4, and then air in the tube 1 was drawn by means of a suction pump (less than $10^{-5}$ torr) via a branched portion 3 of the tube 1. Then the tube 1 was heated at about 420° C. by means of a heater (not shown) for evaporating the water adsorbed in the reducing agent 2 so as to dry zinc metal particles 2.

Following the above drying step, 5 $\mu$l of the sample water (river water, ground water or the like) was added into the tube 1 by a fine pipet (not shown) and the sample was frozen by suspending the tube 1 in liquid nitrogen bath. After the freezing, the tube 1 was evacuated and sealed off by the cock 4.

Reaction between water molecules in the sample and metal zinc elements of the reducing agent was performed by heating the frozen tube 1 containing the sample and the reducing agent at 420° C. for approximately 2 to 4 hours to reduce water molecules chemically into hydrogen gas.

(3) Determination of a Hydro-Gasification Rate of the Sample

The resulting hydrogen gas was supplied into the mass spectrometer (Finnigan Mat Delta-E type, Finnigan Mat Co., LTD.) and determine a hydro-gasification ratio thereof. Obtained results were listed in Table 1 below. The table shows the results at 4 hours after the reaction initiation.

The ratio of the masses between ordinary hydrogen elements and deuterium elements in the sample hydrogen gas was followed to be determined by comparison with those of hydrogen gas prepared from a standard water (Standard Mean Ocean Water) issuing from IAEA.

The determination of the hydro-gasification by the mass spectrometer was performed by a well-known routine procedure which can be easily performed by a skilled man in the art using his ordinary skill and knowledge.

TABLE 1

| Ni added (ppm) | Hydro-gasification rate (%) |
|---|---|
| 0 | 10 |
| 6 | 30 |
| 15 | 100 |
| 40 | 100 |
| 300 | 100 |
| 5000 | 100 |

As shown in the above table, hydrogen elements in the sample was completely gasificated in the cases when over 10 ppm of nickel elements were incorporated in the zinc metal particles.

EXAMPLE 2

A preferable size of the zinc crystal of the zinc metal particles for hydro-gasification of the reduction of water was determined as follows.

In this example, four different types of reduction agents were prepared as described in the Example 1 except that 400, 15, 6 and 0 ppm of Ni were respectively incorporated therein.

Also, preparation of the hydrogen gas and the determination of the hydro-gasification rate were performed as described in the Example 1 and a mean crystal size of the zinc metal in the particles was measured by means of reflecting microscope. The obtained results were listed in Table 2 below. The table shows the results at stag 4 hours after the reaction initiation.

TABLE 2

| Ni added (ppm) | Mean crystals size (um) | Hydro-gasification rate (%) |
|---|---|---|
| 400 | 1 | 100 |

TABLE 2-continued

| Ni added (ppm) | Mean crystals size (um) | Hydro-gasification rate (%) |
| --- | --- | --- |
| 15 | 5 | 100 |
| 6 | 7 | 30 |
| 0 | 40 | 10 |

As shown in the table, hydrogen in the sample was completely gasified in the case that a mean crystal size was 5 μm or less.

Accordingly, the water sample can be perfectly reduced by reacting with zinc metal particles comprising 10 ppm of nickel elements and having 5 μm or less of a size of the zinc metal crystal thereof, so that the masses ratio of hydrogen isotopes in the sample can be precisely determined by supplying the hydrogen gas from the sample into the mass spectrometer.

What is claimed is:

1. A process of preparing hydrogen gas comprising the steps of:
    granulating zinc metal so that it consists of zinc metal crystals having a mean size of 5 μm or less including the step of adding nickel in the amount of 10 to 10,000 ppm per part of zinc to obtain zinc metal particles having a size of 1-2 mm which are used as a reducing agent; and
    reacting water with said reducing agent at a selected reaction temperature to reduce said water chemically into hydrogen gas.

2. A process according to claim 1, wherein said reaction temperature is from 400° to 4502 C.

3. A process according to claim 1 or 2, wherein the reaction between said water and said reducing agent is performed for 2-4 hours.

4. A process of determining the ratio of masses of hydrogen isotopes in a water sample including the steps of:
    (1) preparing hydrogen gas comprising eh steps of:
      (i) granulating zinc metal so that it consists of zinc metal crystals having a mean size of 5 μm or less including the step of adding nickel in the amount of 10 to 10,000 ppm per part of zinc to obtain zinc metal particles having a size of 1-2 mm which are used as a reducing agent, and
      (ii) reacting water with said reducing agent at a selected reaction temperature to reduce said water chemically into hydrogen gas; and
    (2) determining the ratio of masses of hydrogen isotopes in said hydrogen gas.

5. A process according to claim 4, wherein said determination of the ratio of masses of hydrogen isotopes is performed by means of a mass spectrometer.

6. A process according to claim 4 or 5, wherein said reaction temperature is form 400° to 450° C.

7. A process according to claim 4 or 5, wherein the reaction between said water and said reducing agent is performed for 2-4 hours.

* * * * *